United States Patent
Meibuhr

[11] 3,802,922
[45] Apr. 9, 1974

[54] STABILIZATION OF NICKEL BORIDE CATALYST IN POTASSIUM HYDROXIDE ELECTROLYTES

[75] Inventor: Stuart G. Meibuhr, Birmingham, Mich.

[73] Assignee: General Motors Corporation, Detroit, Mich.

[22] Filed: Sept. 25, 1972

[21] Appl. No.: 291,583

[52] U.S. Cl. .................................... 136/120 FC
[51] Int. Cl. ............................. H01m 13/00
[58] Field of Search........ 136/120 FC, 120 R, 86 D, 136/28–29, 20; 252/432; 423/276

[56] References Cited
UNITED STATES PATENTS

| | | | |
|---|---|---|---|
| 3,183,123 | 5/1965 | Haworth | 136/120 FC X |
| 3,470,030 | 9/1969 | Lindholm et al. | 136/120 FC |
| 3,513,028 | 5/1970 | Salomon | 136/120 FC X |

*Primary Examiner*—Anthony Skapars
*Attorney, Agent, or Firm*—Lawrence B. Plant

[57] ABSTRACT

This invention relates to hydrazine fuel cell electrodes employing nickel boride as a catalyst and used with aqueous potassium hydroxide electrolytes. More particularly, this invention relates to soaking the nickel boride in a hot potassium hydroxide solution containing borax to retard degradation of its effectiveness upon continued exposure to aqueous potassium hydroxide electrolyte and to thereby extend the useful life of hydrazine electrodes made therefrom.

3 Claims, No Drawings

STABILIZATION OF NICKEL BORIDE CATALYST IN POTASSIUM HYDROXIDE ELECTROLYTES

BACKGROUND OF THE INVENTION

Nickel boride has been proposed as a catalyst for a number of fuel cell reactions carried out in aqueous potassium hydroxide electrolytes. In this regard, the nickel boride catalyst is useful at an anode to promote the oxidation of a number of fuels including hydrogen, hydrazine, hydrazine derivatives (e.g., monomethylhydrazine), etc. Nickel boride has also been suggested as being useful at cathodes used with air or oxygen. The nickel boride can be formed, compacted, and sintered into a self-supporting electrode or, as is usually the case, it is supported on a separate electrically conductive member made from a high surface area, low resistivity material which is inert to attack of the potassium hydroxide electrolyte. The precise shape or structure of the electrically conductive support carrying the catalyst varies according to the nature of the reactant used with it. In this regard, gaseous (e.g., hydrogen or oxygen) reactants have different support requirements than liquid reactants. Examples of typical catalyst supports for gaseous reactants include reticulated metal foam, wire meshes, felts of sintered metal fibers, porous carbon, and sintered carbon-Teflon particles, as are known to those skilled in the art. Sintered carbon-Teflon type supports are described in more detail in the introduction to United States patent application Ser. No. 86,058, filed Nov. 2, 1970, in the name of Romeo R. Witherspoon entitled "Hydrophilic Treatment of Fuel Cell Electrodes" and assigned to the assignee of the present invention. An example of an electrode support useful with a liquid fuel (i.e., hydrazine) is an impervious metal foil having a plurality of catalyst anchorage sites firmly bonded to its surface. One such electrode has electrolytic-nickel-bonded carbonyl nickel particles as the anchorage sites with a nickel boride catalyst and is described in U.S. Pat. application Ser. No. 272,309, filed July 17, 1972, in the name of Stuart Meibuhr et al., entitled "Method of Making Anodes for Hydrazine Fuel Cells" and assigned to the assignee of the present invention. The appropriate portions of the aforesaid patent application are intended to be herein incorporated by reference.

The electrically conductive supports have been catalyzed with nickel boride in a number of ways, including wetting the support with a solution of a nickel salt and subsequently immersing the wetted support in a solution of an alkali metal borohydride to chemically form the nickel boride in situ on the support. Another technique comprises spreading a pre-formed nickel boride paste onto/into the support by troweling or the like.

Nickel boride catalyzed hydrazine electrodes which are in continuous contact with aqueous potassium hydroxide solutions are usually short-lived. In this regard, nickel boride catalyzed hydrazine electrodes gradually polarize with time until finally the available potential from the electrode falls below a practicable value. More specifically, it has been observed that boron leaches out of the nickel boride catalyst and into the potassium hydroxide at about the same rate as the performance of the electrode decays. The affects of this degradation of the nickel boride catalyst is manifested by an increase in the iR-free polarization of the electrode as measured against a standard Hg/HgO reference electrode using a modified Kordesch-Marko interrupter to correct for solution iR-drop. Boron loss to the electrolyte, which is periodically analyzed, is directly proportional to contact time between the nickel boride and the electrolyte and is apparently independent of anodic current density. Boron loss to a 33% KOH electrolyte, for example, was measured at about 0.018 micrograms per hour.

BRIEF DESCRIPTION OF THE INVENTION

It is an object of the present invention to stabilize nickel boride catalyst, which is to be used with hydrazine electrodes in contact with potassium hydroxide electrolyte, to the extent of substantially reducing its degradation rate and thereby reduce the rate at which a nickel boride catalyzed hydrazine electrode's performance decays. This and other objects of this invention will become more apparent from the detailed description which follows.

According to this invention the nickel boride is soaked for at least about 5 minutes but less than about 30 minutes in an aqueous solution of potassium hydroxide containing at least about 200 grams per liter of borax and heated to a temperature of about 90°C. – 100°C. Longer soak times at this temperature result in a loss in performance. In this regard and though better than untreated samples, samples soaked for 30 minutes had only about one half the life of samples treated for 15 minutes under the same conditions of temperature and borax concentration. The precise mechanism whereby electrode life is improved is not understood, but it is believed to be related to affecting the boron leach rate from the nickel boride. Regardless, the KOH-borax soak of the present invention substantially extends the useful life of hydrazine electrodes treated thereby.

DISCUSSION OF PREFERRED EMBODIMENTS

In a preferred form of the invention, the nickel boride is first deposited on the support and then soaked at about 93°C. for about 15 minutes in a 30 percent potassium hydroxide solution containing at least about 300 grams/liter of borax. Samples thusly treated outlive untreated samples by a factor of about four to one. In this regard, observations were made using hydrazine anodes catalyzed with nickel boride but not treated in accordance with this invention. These anodes exhibited a time decay in performance as measured by the iR-free potential against a Hg/HgO reference electrode. Examination of the electrode surfaces taken before and after the electrochemical runs, as well as periodic chemical analysis of the electrolyte used in the test, showed that there was a loss of material from the anode and a corresponding increase in the concentration of boron in the potassium hydroxide (33 percent). The rate of loss of boron from the electrode substantially coincided with the rate of decay of the anode potential. By comparison, the rate of decay in electrode potential of nickel boride catalyzed anodes subjected to the KOH-borax soak of this invention was substantially less. More specifically, an arbitrary cut-off potential of −0.95V was used to life-test all anodes. Hydrazine anodes soaked for different time intervals according to this invention had operating lives such that their reference potentials were more negative than −0.95 volts for periods varying from two to four times longer than the untreated anodes. More specifically yet, a number of tests were conducted using nickel boride catalyzed hydrazine anodes of the type disclosed in the aforesaid United States patent application Ser. No. 272,309. Some were untreated and used as controls while others were modified by the KOH-borax soak of this invention. Generally speaking, when operating at a current density of 200 milliamperes per square centimeter ($ma/cm^2$), electrodes not soaked in accordance with this invention decayed to the cut-off voltage of −0.95 volts in about 60 hours of electrochemical operating time and 220 hours of KOH electrolyte contact time. Occassionally, some of these electrodes lasted as much as 80 hours of operating time and 300 hours of contact time. In contrast to this, the KOH-borax soaked anodes sustained from about 135 to 280 hours of electrochemical activity and from about 480 to 950 hours of KOH contact time depending on the soak time used.

To illustrate the invention, dimpled nickel foils (0.05 mm thick) were electroformed on a chromium-plated, stainless steel mandrel from an 18 liter nickel sulfamate and nickel chloride bath comprising 300 grams per liter nickel sulfamate, 6 grams per liter nickel chloride and 30 grams per liter boric acid (pH 203–4.0). The geometric area of the dimpled foil was about 48 $cm^2$ though, due to the dimples, the actual surface was larger. Carbonyl nickel particles (International Nickel Co.) were then electrolytically co-deposited with the electrolytic nickel onto the electroformed foils using a vertical half-box arrangement with the foils at the bottom and using 500 ml of the aforesaid nickel sulfamate electroforming solution and 500 milligrams of carbonyl nickel as described in U.S. Pat. application A-16,963. A nickel anode screen was spaced above the foils to provide an electrode gap of about 62 mm. A potential was established between the foil and the screen and the nickel bath poured into the cell. A stirrer was energized (i.e., 7,100 rpm) and the carbonyl nickel (International Nickel Mond 255) added. Stirring continued for 1 minute and then stopped. Plating continued for about 9 minutes after stirring stopped for a total of about 10 minutes total plating time at a current density of about 0.4 $amps/cm^2$ of the support's geometrical area.

Nickel boride catalyst was then chemically formed in and on the carbonyl nickel by first dipping the support into a 5 percent aqueous solution of nickel acetate for about 15 seconds, draining and then dipping it into an aqueous 10 percent solution of sodium borohydride for about 30 seconds and rinsing. This procedure was repeated three times until about 3 $mg/cm^2$ of nickel boride was formed on the support. After drying, the anodes were soaked for 15 minutes in a 93°C. solution comprising 30 percent KOH and 500 g/l borax. The anodes were removed from the solution and placed into the test cells. Other unsoaked anodes were used as controls.

The test anodes were operated at a constant current density of 200 $ma/cm^2$ for about 2 hours before the initial iR-free polarization data were taken. The test temperature was about 31°C. using about 300 cc of a 33 percent KOH electrolyte containing 3.2 percent hydrazine as the anolyte and flowing it over the anode at a rate of about 100 ml/min. At this flow rate, the fuel concentration was about 16 times the stoichiometric amount. The catholyte was 33 percent KOH and perforated stainless steel was used as the counter electrode at which hydrogen was evolved during testing. The anolyte and catholyte were separated by a microporous membrane material known as Acropor AN 200 (acrylonitrile polyvinylchloride copolymer reinforced with nylon) sold by the Gelman Instrument Company. Polarization data were made daily and the anode was operated at 200 $ma/cm^2$ between polarization runs. The tests were terminated when the iR-free anode-reference potential (Hg/HgO) fell to −0.95V. The anodes were capable of operating for longer times at potential values below −0.95V., but this value was selected as the "cutoff" potential for evaluation purposes.

All nickel boride anodes tested exhibited a time dependence in the anode potential and data was taken both in terms of the number of hours of electrochemical usage of the anode at 200 $ma/cm^2$ and the total contact time between the KOH electrolyte. The total time included electrochemical usage time and open circuit potential time when the test cells were unused overnight and weekends. The total KOH contact time was about 4 times longer than the electrochemical usage time. The anode reference potential for the unsoaked anodes decayed to the arbitrary cutoff voltage of −0.95 volts within 40 to 80 hours of electrochemical usage. On the average, under such usage conditions, these anodes could be expected to perform at potentials above −0.95 volts for times of about 60 hours of electrochemical usage and a KOH contact time of about 220 hours. In contrast, test results on the KOH-borax soaked nickel boride anodes showed an operating life of about 250 hours of electrochemical usage and 950 hours KOH contact time.

While I have disclosed my invention primarily in terms of specific embodiments thereof, I do not intend to be limited thereto except to the extent hereinafter set forth in the claims which follow.

I claim:

1. In the method of making hydrazine fuel cell electrodes for use in an aqueous potassium hydroxide electrolyte including the principal step of depositing fine particles of nickel boride catalyst on an electrically conductive support, the improvement comprising soaking said catalyst for at least about 5 minutes, but less than about 30 minutes in an aqueous solution comprising potassium hydroxide and at least about 200 grams per liter of borax and heated to a temperature of about 90°C. to about 110°C. to retard the rate of decay of the electrode on continued contact with the electrolyte.

2. In the method of making hydrazine anodes for use in an aqueous potassium hydroxide electrolyte fuel cell including the principal step of depositing fine particles of nickel boride catalyst on an electrically conductive support, the improvement comprising soaking said catalyst for about 15 minutes in an aqueous solution comprising about 30 percent, by weight, potassium hydroxide and about 300 grams per liter of borax and heated to a temperature of about 93°C. to retard the rate of decay of the electrode on continued contact with the electrolyte.

3. In the method of making a fuel electrode for use in a hydrazine-fueled fuel cell including the steps of making an electrically conductive support the cathode in a nickel electroplating cell, filling the cell with a nickel plating bath containing suspended particles of carbonyl nickel, passing at least about 5 coulombs per square centimeter of support and less than 24 coulombs per square centimeter of support through said cell to electrolyze said bath and plate electrolytic nickel onto the support while codepositing the particles onto the support along with the electrolytic nickel, contacting the support and wetting the nickel-bound particles thereon with a solution of a soluble nickel salt and solvent therefor, and contacting said wetted nickel-bound particles with a solution of an alkali metal borohydride and solvent therefor to form nickel boride in situ on the nickel-bound carbonyl nickel particles, the improvement comprising soaking the thusly catalyzed support for at least about 5 minutes but less than about 30 minutes in an aqueous solution comprising potassium hydroxide and at least about 200 grams per liter of borax and heated to a temperature of about 90°C. to about 100°C. to retard the rate of decay of the electrode on continued contact with the potassium hydroxide electrolyte.

* * * * *